Nov. 28, 1967 J. B. BREWSTER 3,355,671

SOLID STATE FUNCTION GENERATOR

Filed Sept. 22, 1964

6 Sheets-Sheet 1

INVENTOR.
JEROME B. BREWSTER
BY
John F. Luhrs
ATTORNEY

Nov. 28, 1967 J. B. BREWSTER 3,355,671

SOLID STATE FUNCTION GENERATOR

Filed Sept. 22, 1964

6 Sheets-Sheet 2

INVENTOR.
JEROME B. BREWSTER
BY
John F. Lahra
ATTORNEY

Nov. 28, 1967 J. B. BREWSTER 3,355,671

SOLID STATE FUNCTION GENERATOR

Filed Sept. 22, 1964 6 Sheets-Sheet 3

INVENTOR.
JEROME B. BREWSTER
BY
ATTORNEY

Nov. 28, 1967 J. B. BREWSTER 3,355,671

SOLID STATE FUNCTION GENERATOR

Filed Sept. 22, 1964

6 Sheets-Sheet 4

INVENTOR.
JEROME B. BREWSTER
BY
ATTORNEY

INVENTOR.
JEROME B. BREWSTER
BY
John F. Lubra
ATTORNEY

INVENTOR.
JEROME B. BREWSTER
BY
John F. Lehman
ATTORNEY

United States Patent Office 3,355,671

Patented Nov. 28, 1967

3,355,671

SOLID STATE FUNCTION GENERATOR

Jerome B. Brewster, Cleveland Heights, Ohio, assignor to Bailey Meter Company, a corporation of Delaware Filed Sept. 22, 1964, Ser. No. 398,311
9 Claims. (Cl. 330—30)

ABSTRACT OF THE DISCLOSURE

A solid state function generator employing a D.C. amplifier, wherein the output signal from the amplifier is maintained in functional relationship to an input signal, incorporating a pair of transistors each having a base, a collector and an emitter, the base potential of one transmitter being controlled by the output signal from the amplifier and the base potential of the other transmitter being controlled by an input signal, the collectors of the transmitters being connected to a summing junction, the emitter of one transmitter being connected to one D.C. potential and the emitter of the other transmitter being connected to a second D.C. potential. The potential of the summing junction forms the input signal to the amplifier.

This invention relates to a function generator. In particular this invention relates to a solid state function generator that simulates a desired function in segmented steps.

Function generators are widely used in modern control systems where the desired control signal is not related to the error signal by a first order equation. Control of a boiler in a central power station is a good example showing the necessity of using function generators. The usual method of measuring steam flow from a boiler is to develop a differential pressure across an orifice. A differential pressure transmitter measures the pressure drop and generates a signal proportional thereto. Because flow rate is proportional to the square root of the generated signal a function generator is required to give a signal that varies linearly with flow.

Earlier electronic function generators employed expensive chopper-input amplifiers with complicated diode feedback circuits. Although they generated the desired function the adjustments required were complicated and many. Often the cost of calibration was greater than the cost of the equipment.

It is an object of my invention to provide an electronic function generator having a minimum of adjustments and using an inexpensive direct current amplifier with a differential input stage.

One of the disadvantages of direct current amplifiers is their inherent drift characteristics. It has been found this can be substantially eliminated by using a differential amplifier as the input stage. Differential amplifiers are known for their temperature and leakage current stability. Another disadvantage of the direct current amplifier is that gains of less than 1 are difficult to obtain. Gains greater than 1 are readily obtainable, it is only gains of less than 1 that are difficult to develop. Usually, when employing a differential amplifier as the input stage, the feedback signal is connected to one of the differential sections by a simple voltage divider arrangement which results in some fraction of the output voltage applied to the differential amplifier. Since the feedback voltage must be equal to or less than the output, the amplifier gain is always greater than 1.

Another shortcoming of function generators that use a chopper-input amplifier is the relatively high amplifier input impedance. Needless to say, any error currents developed through a high resistance input, such as from temperature variation or transistor leakage, will cause an error voltage at the amplifier output. When using a differential-input direct current amplifier the input source resistance is low and balanced with the result that temperature and leakage currents generate only an insignificant error voltage at the amplifier output.

Often it is necessary to design the chopper-input amplifier with a high impedance input because of the high impedance input and feedback circuits. Such high impedance computing circuits are necessary to avoid loading the circuit supplying the input signal to the function generator. My circuit uses high impedance computing circuits to avoid loading, but because of the unique input and feedback circuitry the necessity for a high impedance amplifier is eliminated.

An object of my invention is to provide a function generator using a direct current amplifier having gains greater than or less than 1.

Another object of my invention is to provide a function generator employing an amplifier having a low input impedance.

Still another object of my invention is to provide a function generator having a high impedance computing circuit and a low impedance amplifier.

Another object of my invention is to provide a function generator that approximates a given curve with straight line segments.

With my circuit, the function generator cost is directly proportional to the accuracy desired. If only a rough approximation of the curve is needed the feedback circuit can be relatively simple and the cost proportionally low. On the other hand, if a high degree of accuracy is required a more complicated feedback circuit is used with its attendent higher costs.

Other objects and advantages of my invention will become apparent from the following description including the accompanying drawings and particularly pointed out in the appended claims.

Referring to the drawings.

Figure 1:
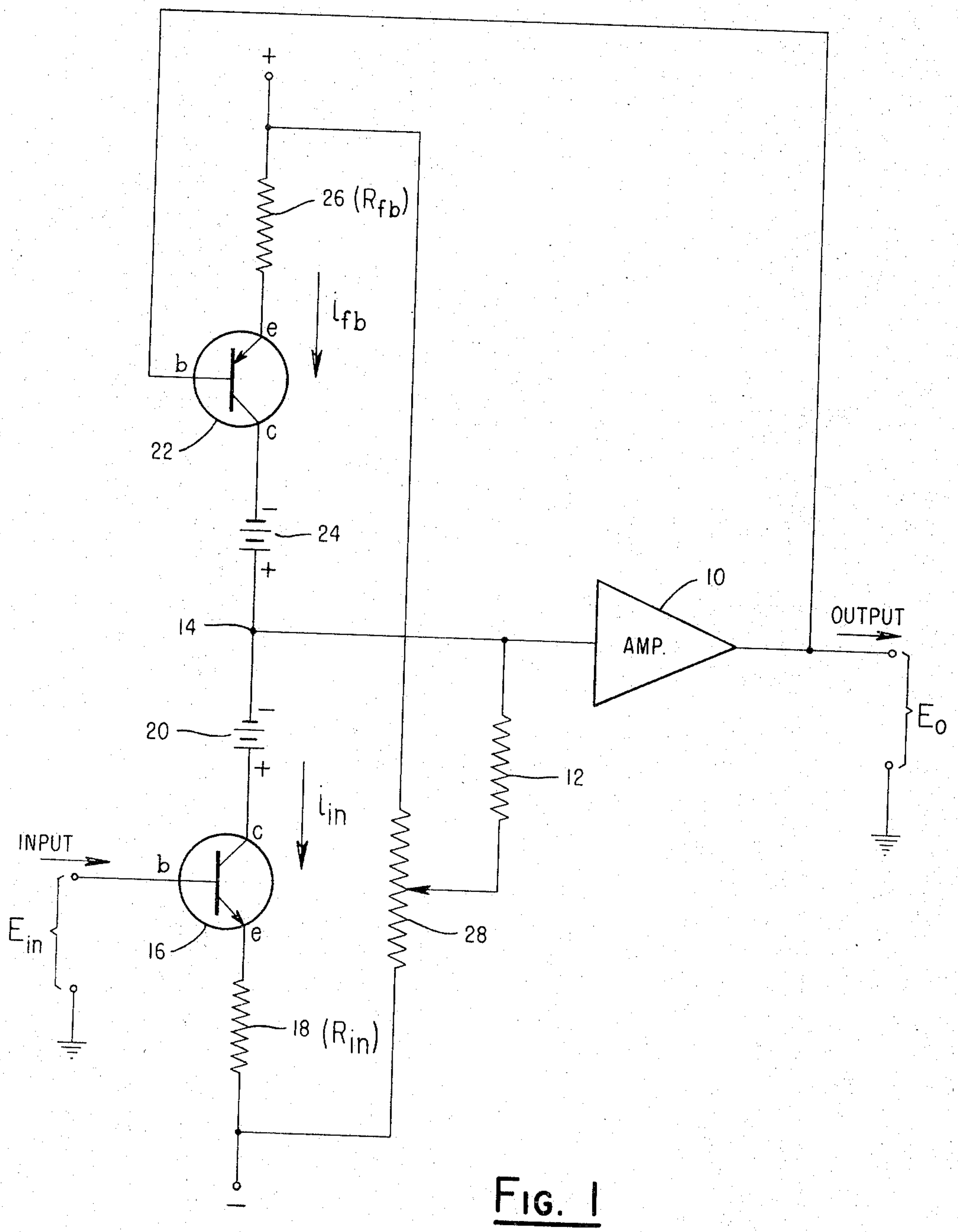
FIG. 1 is a schematic diagram of a function generator where the output voltage $E_o$ is proportional to the input voltage $E_{in}$.

Referring to FIG. 1, I show an amplifier 10 having a gain of +A and an input signal equal to the voltage drop across a base drive resistor 12. The voltage drop developed across the base resistor 12 is proportional to the current therethrough which in turn equals the difference between the instantaneous value of feedback current $i_{fb}$ and the instantaneous value of input current $i_{in}$, as determined at a current summing junction 14.

The input current $i_{in}$ equals the current flow in the collector-emitter junction of an input transistor 16 having a base, collector and emitter junction. Connected to the base electrode $b$ is the input signal to the function generator, $E_{in}$, which can be a direct current signal or a signal of varying magnitude. A change in input signal $\Delta E_{in}$ causes a change in current flow through the collector-emitter junction of transistor 16 and through an input resistor 18 connected to the emitter electrode *e* and to a source of D-C voltage. The D-C source supplies a voltage more negative than the lowest possible value of $E_{in}$ thereby biasing transistor 16 in the conducting state at all times. As mentioned previously, the input impedance to my function generator is high. This being determined by the $\beta$-factor of the input transistor 16 and the ohmic value of the input resistor 18. For example, if the input resistor has a value of 25K and the input transistor has a $\beta$ of 40 then the input impedance will be 100K.

Connected to the collector electrode *c* is the positive terminal of a direct current bias supply 20, which has its negative terminal connected to the current summing junction 14.

The instantaneous value of feedback current $i_{fb}$ equals the current flow in the collector-emitter junction of a feedback transistor 22 also having a base, emitter and collector electrode. Connected to the collector electrode *c* of the feedback transistor 22 is the negative terminal of a direct current bias supply 24, which has its positive terminal connected to the current summing junction 14. Connected to the base electrode *b* is the output signal $E_o$ of the amplifier 10. A change in output signal $E_o$ causes a change in current flow through the collector-emitter junction of the feedback transistor 22 and through a feedback resistor 26 connected to the emitter electrode *e* and a source of D-C voltage. The D-C source supplies a voltage which biases the feedback transistor 22 in its conducting state at all values of output voltage.

In operation the function generator of FIG. 1 works as follows: a change in input signal connected to the base electrode *b* of the input transistor 16 generates an incremental collector current the value of which is determined by the gain of transistor 16 and the ohmic value of the input resistor 18. This current, designated the incremental input current $i_{in}$, and the instantaneous collector current of the feedback transistor 22 are algebraically added at the summing junction 14. The change in collector current of the feedback transistor 22 is designated the incremental feedback current $i_{fb}$ and is determined by the change in output signal $\Delta E_o$ of amplifier 10, the gain of transistor 22 and the ohmic value of the feedback resistor 26.

According to Kirchhoff's current law, the amount of current flowing away from the summing junction 14 must equal the current flowing toward said junction. Therefore, if the incremental input current $i_{in}$ equals X and the incremental feedback current $i_{fb}$ equals $X-Y$ then the current flowing through the base drive resistor 12 equals $-Y$. This is based on the assumption that the ohmic value of the base drive resistor 12 is much less than the input impedance of the amplifier 10. The sign of Y of course will vary depending on the direction of current flow of $i_{in}$ and $i_{fb}$.

The difference between the incremental feedback and input currents generates a voltage across the base drive resistor 12 which is the input signal to the amplifier 10. The incremental change in the output voltage of said amplifier being related to the base drive voltage by the equation:

$$\Delta E_o = +AE_e \quad (1)$$

where $+A$ is the amplifier gain

If the base drive resistor 12 has an ohmic value equal to $R_b$ then Equation 1 can be rewritten as:

$$\Delta E_o = +AR_b(i_{in} - i_{fb}) \quad (2)$$

Dividing both sides of Equation 2 by $+AR_b$ it becomes:

$$\frac{\Delta E_o}{+AR_b} = i_{in} - i_{fb}$$

if $$+A >> 1$$

then $$\frac{\Delta E_o}{+AR_b} \to 0$$

and $$i_{in} = i_{fb} \quad (3)$$

Equations 1, 2 and 3 show that a change in input signal will generate a change in output signal which in turn develops a collector-current through the feedback transistor 22 equal to the current flow through the collector-emitter junction of transistor 16. Note, to satisfy the above equations it is not necessary for the output voltage $E_o$ to equal the input voltage $E_{in}$. The only variables of the function generator that are equal at a steady state condition are the input and feedback currents. These terms are determined by the size of the emitter resistors and the output and input voltages, respectively.

Since the voltage at the emitter electrode *e* of transistor 16 nearly equals the voltage at the base electrode *b*, which is the input voltage $E_{in}$, the instantaneous input current $i_{in} = \Delta E_{in}/R_{in}$; where $R_{in}$ is the ohmic value of the input resistor 18. Likewise, a change in the output voltage $\Delta E_o$ will appear at the emitter electrode *e* of the feedback transistor 22 and the instantaneous feedback current $i_{fb} = -\Delta E_o/R_{fb}$; where $R_{fb}$ equals the ohmic value of the feedback resistor 26. If the above values for the input current $i_{in}$ and the feedback current $i_{fb}$ are substituted into Equation 3 it can be re-written as:

$$-\Delta E_o/R_{fb} = \Delta E_{in}/R_{in}$$

$$\Delta E_o = -\Delta E_{in}(R_{fb}/R_{in}) \quad (4)$$

Equation 4 is similar to the well known equation which defines the gain of an operational amplifier. It shows that the change in output voltage $\Delta E_o$ is proportional to the change in input voltage $\Delta E_{in}$. The constant of proportionality being equal to $R_{fb}/R_{in}$. To vary the proportionality, or gain, it is only necessary to vary either $R_{fb}$ or $R_{in}$. When $R_{fb}$ is less than $R_{in}$ the gain is less than 1. This is in accordance with one of the objects of my invention wherein I provide a function generator with a gain of more or less than 1.

To provide a biased output signal or a zero-adjustment, as the case may be, the base drive resistor 12 is connected to the wiper arm of a potentiometer 28. The potentiometer 28. The potentiometer terminals in turn are connected to the direct current sources supplying the emitter electrodes of transistors 18 and 22.

Figure 2:
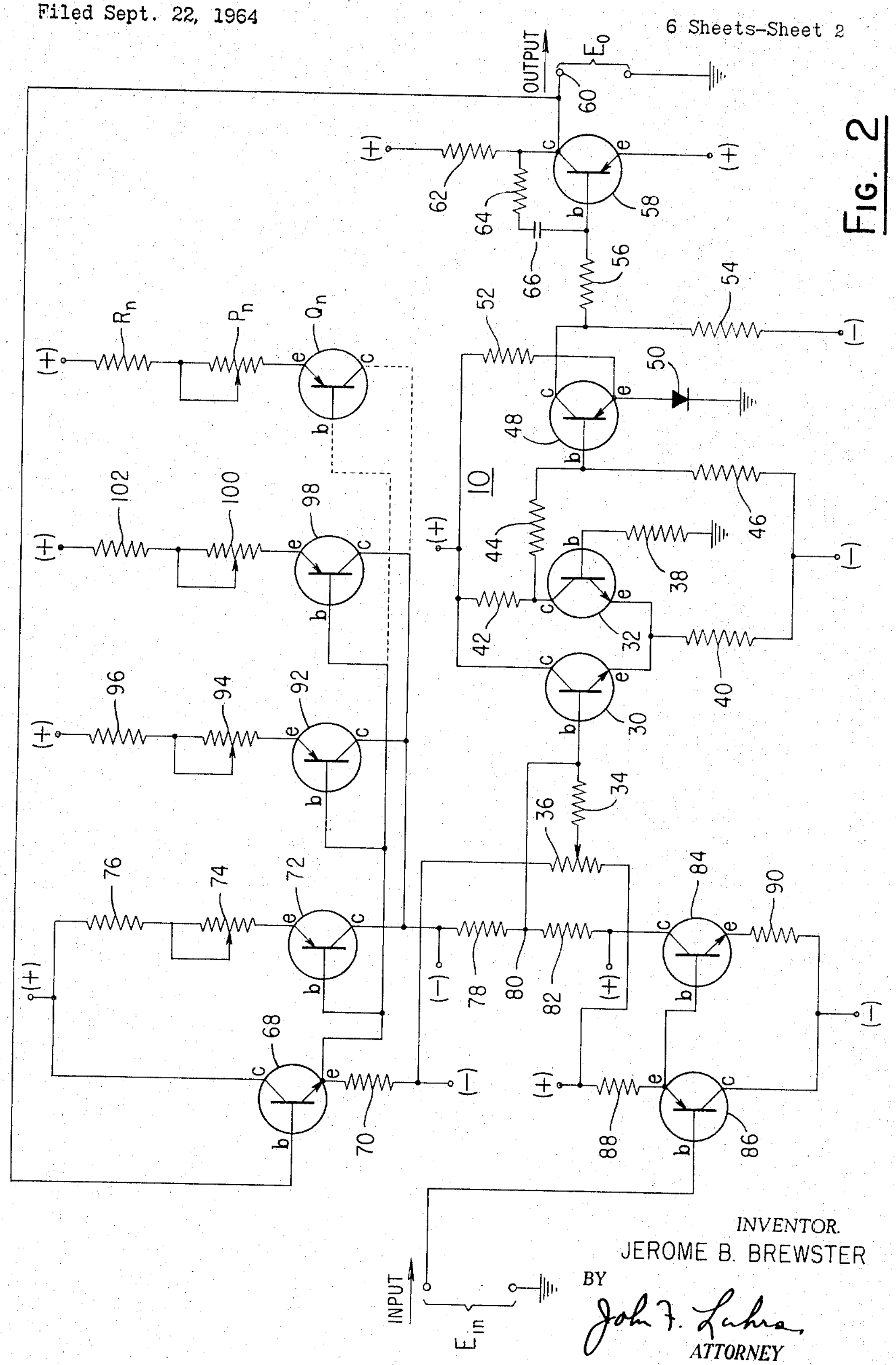
FIG. 2 is a schematic diagram of a transistorized function generator where the output voltage $E_o$ is made up of $n$-number of segments.

Referring now to FIG. 2, I show a function generator for generating a segmented output signal, the number of segments being equal to the number of feedback transistors.

The amplifier 10 of FIG. 1, as shown in FIG. 2, includes a differential input stage and two direct current amplifier stages. The differential input includes a first transistor 30 having a base, emitter and collector electrode, and a second transistor 32 also having a base, emitter and collector electrode. Connected to the base electrode *b* of transistor 30 is a base drive resistor 34 which in turn connects to the wiper arm of a bias or zero adjusting potentiometer 36. The terminal connections of the potentiometer 36 are connected to minus and plus direct current supplies. Connected to the base electrode *b* of transistor 32 is a second base drive resistor 38 substantially equal in resistive value to that of resistor 34. Since the operation of differential amplifiers is believed to be well known it will not be necessary to dwell on its description. Emitter electrodes *e* of transistors 30 and 32 are interconnected and in turn connected to an emitter resistor 40. The emitter resistor 40 also connects to a direct current supply. Collector electrode *c* of transistor 30 is connected to a direct current supply, which also connects to the collector electrode *c* of transistor 32 through a bias resistor 42. Also connected to the collector electrode *c* of transistor 32 is a voltage divider network including resistors 44 and 46. Resistor 46, in turn, connects to a direct current supply.

Connected to the junction of resistors 44 and 46 is the base electrode *b* of a first stage transistor 48. The emitter electrode *e* of transistor 48 connects to ground through a diode 50 and to a direct current supply through a bias resistor 52. Collector electrode *c* of transistor 48 is connected to a bias resistor 54 which in turn connects to a direct current supply. A base drive resistor 56 interconnects the collector electrode *c* of transistor 48 with the base electrode *b* of a second stage transistor 58. Connected to the emitter electrode *e* of transistor 58 is a direct current supply while the collector electrode *c* connects to an output terminal 60, a bias resistor 62, and a collector-base feedback circuit including resistor 64 and capacitor 66.

Since there is nothing new in the operation of amplifier 10, including the differential input stage and the two direct current stages, a detailed description of operations will not be given. Briefly the amplifier operates as follows: a signal at the base electrode *b* of transistor 30 generates a signal proportional thereto at the collector electrode *c* of transistor 32. After subsequent amplification by transistors 48 and 58, the signal at the collector electrode *c* of transistor 32 appears as the output voltage $E_o$ at the output terminal 60.

The output signal at terminal 60 is connected to the base electrode *b* of transistor 68 biased in a conducting state by a direct current supply, not shown. With transistor 68 biased conducting, a change in the output signal at terminal 60 causes a variation in current flow through an emitter resistor 70 connected to the emitter electrode *e* and a direct current supply. The chief purpose of transistor 68 is to compensate for the $V_{be}$ drop of the feedback transistors used to shape the output signal. Thus, transistor 68 is connected as an emitter-follower with its inherent characteristic of a gain of 1.

A voltage signal nearly equal to the output signal at terminal 60 is developed at the emitter electrode *e* of transistor 68 and is connected to the base electrode *b* of a feedback transistor 72 thereby generating a feedback current $i_{fb}$ in a feedback potentiometer 74 and a feedback resistor 76. The feedback resistor 76 connects to a direct current supply which biases transistor 72 conducting for all possible values of output voltage at terminal 60. In addition to the feedback potentiometer 74 and resistor 76, the feedback current path includes the collector electrode *c* and a bias resistor 78, connected to a summing junction 80.

As in the case of the circuit in FIG. 1, the feedback current $i_{fb}$ and the input current $i_{in}$ are algebraically added at the summing junction 80. The input current path includes a bias resistor 82 and the collector-emitter junction of a transistor 84. The input current $i_{in}$ is proportional to a change in input signal $\Delta E_{in}$ connected to the base electrode *b* of a transistor 86. A direct current supply connected to the emitter electrode *e* of transistor 86 biases it in a conducting state for all possible values of input signal. Transistor 86 has the same circuit function as transistor 68 of the feedback loop, that is, it corrects for the $V_{be}$ drop of the input transistor 84. Like its counterpart, transistor 68, transistor 86 is connected as an emitter-follower with the emitter electrode *e* connected to the base electrode *b* of transistor 84. Thus, the input current $i_{in}$ in the collector-emitter junction of transistor 84 will be proportional to a change in the base drive voltage of transistor 84 (which nearly equals the input signal $\Delta E_{in}$) and to the resistive value of the input resistor 90 connected to the emitter electrode *e* of transistor 84.

In FIG. 1 the feedback and input transistors were biased by direct current supplies indicated as batteries 20 and 24. In FIG. 2 these batteries have been replaced by resistors 78 and 82 which are connected to an isolated direct current supply.

The circuit of FIG. 2, that I have so far described, operates very similar to the circuit described in FIG. 1. Thus, the instantaneous input current $i_{in}$ and the instantaneous feedback current $i_{fb}$ are algebraically added at the current summing junction 80. With the summing junction 80 connected to the base drive resistor 34, any difference between the input and feedback currents appears as a voltage drop across said base drive resistor. Since the voltage developed across resistor 34 is the input signal to amplifier 10, said amplifier has an input proportional to the instantaneous current difference. The overall gain of the circuit, that is, from the base *b* of transistor 86 to the output terminal 60, depends on the ohmic value of the input resistor 90 and the ohmic value of the feedback potentiometer 74 and resistor 76, as established by Equation 4.

Now, if additional feedback transistors are connected in parallel with the feedback transistor 72 the output voltage $E_o$ changes from the straight line relationship of FIG. 1. Each additional feedback transistor will be connected in the feedback circuit similar to the connection of transistor 72. Thus, the base electrode *b* of feedback transistor 92 connects to the voltage signal at the emitter electrode *e* of transistor 68. Above a preset level the voltage at emitter *e* of transistor 68 will back bias transistor 92. The level at which transistor 92 becomes forward biased will be determined by the direct current voltage connected to the emitter electrode *e* of transister 92. This voltage being supplied to the emitter electrode *e* through a feedback potentiometer 94 and a feedback resistor 96. As transistor 92 conducts its collector-emitter current will be added to the collector-emitter current of transistor 72 at the common junction of their respective collector electrodes and the bias resistor 78.

According to Equation 4 the instantaneous output voltage $\Delta E_o$ is related to the instantaneous input voltage as follows:

$$\Delta E_o = -\Delta E_{in}(R_{fb}/R_{in})$$

When the only feedback transistor conducting was transistor 72, the feedback resistance $R_{fb}$ equalled the resistive value of the potentiometer 74 plus the resistor 76. The gain of the function generator, with only transistor 72 conducting, equalled the sum of the potentiometer 74 and the resistor 76 over the resistive value of resistor 90. When feedback transistors 72 and 92 are conducting the feedback resistance will equal the parallel combination of potentiometer 74 plus resistor 76 and potentiometer 94 plus resistor 96. The feedback resistor $R_{fb}$ is now given as:

$$R_{fb} = \frac{(P_{74}+R_{76})(P_{94}+R_{96})}{(P_{74}+R_{76})+(P_{94}+R_{96})}$$

If one or the other of the above bracketed terms is not very much larger than the other, $R_{fb}$ will be less than when only feedback transistor 72 was conducting. Consequently the gain will be lower since the input resistance $R_{in}$ has not changed.

For every additional feedback transistor paralleled with transistor 72 another gain change will occur. To effect another change, transistor 98 will be paralleled with transistors 72 and 92. The base electrode *b* of transistor 98 is connected to the emitter electrode *e* of transistor 68 which, as explained previously, is varying in accordance with variations in the output $E_o$. When the output signal decreases below the voltage supplying the emitter electrode *e* of transistor 98 it will be forward biased and begin to conduct. As transistor 98 goes into its conducting state an emitter-collector current will flow through a feedback potentiometer 100 and a feedback resistor 102 and be algeraically added with the collector currents of transistors 72 and 92. The total feedback resistance $R_{fb}$ will now be the parallel combination of potentiometer 74 plus resistor 76, potentiometer 94 plus resistor 96 and potentiometer 100 plus resistor 102. In equation form the feedback resistor $R_{fb}$ will be:

$$\frac{1}{R_{fb}}=\frac{1}{(P_{74}+R_{76})}+\frac{1}{(P_{94}+R_{96})}+\frac{1}{(P_{100}+R_{102})}$$

Figures 3, 5:
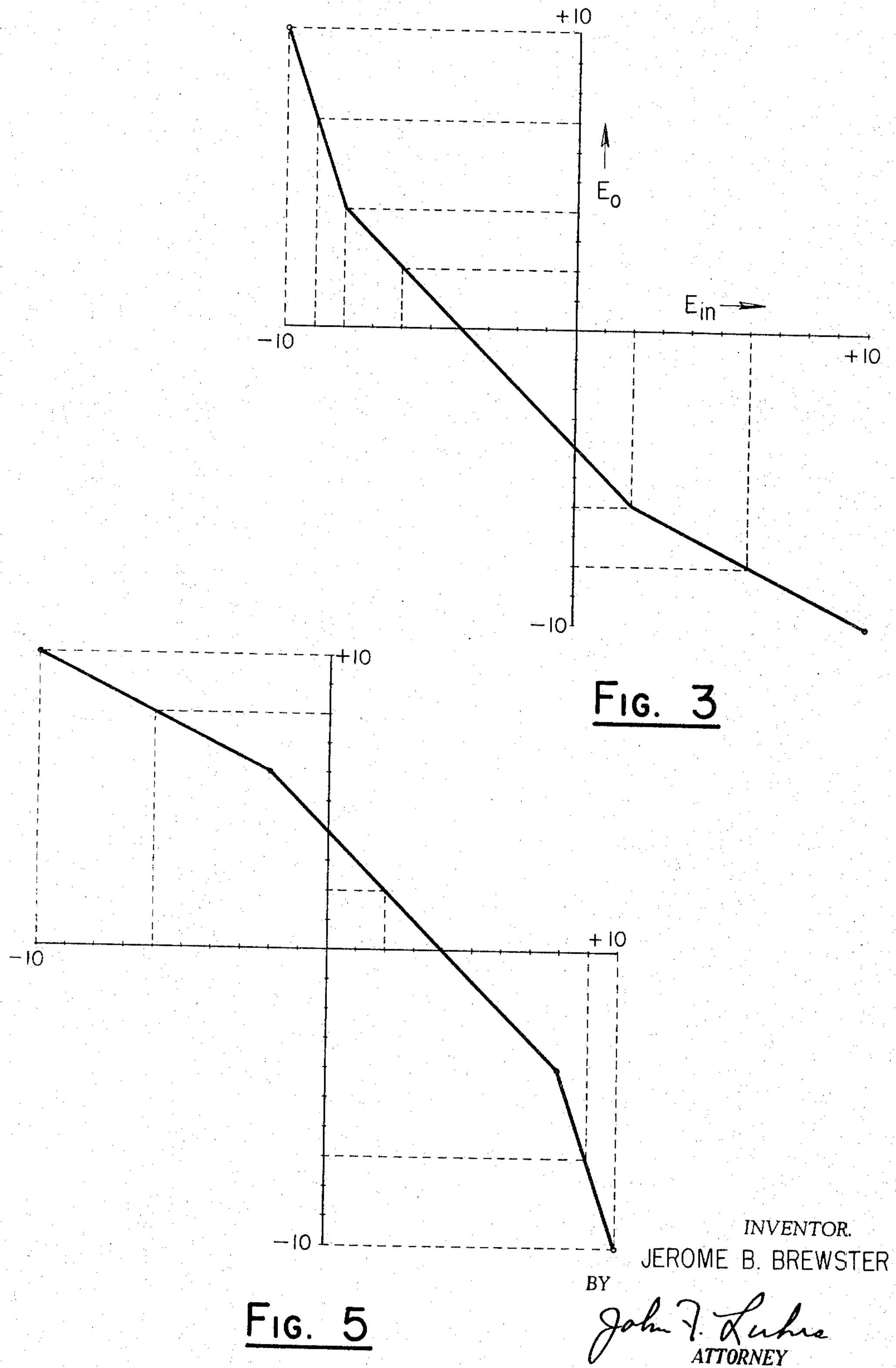
FIG. 3 is a plot of output voltage $E_o$ versus input voltage $E_{in}$ for the circuit of FIG. 2 where $n=3$.
FIG. 5 is a plot of the output voltage $E_o$ versus the input voltage $E_{in}$ for the circuit of FIG. 4 where $n=3$.

Referring now to FIG. 3, I show a plot of output voltage versus input voltage for a circuit having feedback transistors 72, 92 and 98. As shown in FIG. 3 the input and output signals will be varying from −10 volts to +10 volts. This is merely an arbitrary limit set for purposes of this description. It should be understood that by merely changing the various bias supplies other ranges could be used. Also the input, output or both could be varying on one side of the zero axis. It will also be noticed that a polarity reversal takes place between the input and output signals, this is the normal operation for function generators.

Using the −10 volt to +10 volt signal range, as an example, and starting with a −10 volt input signal, the potentiometer 36 would be adjusted to give a +10 volt output signal $E_o$ at the output terminal 60. Assuming the output is varying along the curve of FIG. 3, then as the input signal changes from −10 volts to −9 volts the output signal changes from +10 volts to +7 volts. Therefore, the output voltage is changing three times as fast as the input voltage. Returning to Equation 4, it will be recalled that:

$$\Delta E_o=-\Delta E_{in}(R_{fb}/R_{in})$$

where $\Delta E_{in}$ is the change in input signal from −10 volts to −9 volts. Since the output signal changed three times as fast as the input signal, the ratio of $R_{fb}$ to $R_{in}$ is three to one, which means the feedback resistor 76 plus the feedback potentiometer 74 has three times the resistive value of the input resistor 90. The change in output signal will continue at three times the change in input so long as only feedback transistor 72 is conducting.

When the output signal $E_o$ equals the bias supply of feedback transistor 92 it will begin to conduct thereby changing the ratio of $\Delta E_o$ to $\Delta E_{in}$. Assume a +4 volt supply connected to the feedback resistor 96 and a −8 volt input signal, the output signal will be +4 volts and feedback transistor 92 will begin to conduct. Now a 2 volt change in the input signal from −8 volts to −6 volts only causes a 2 volt change in the output signal from +4 volts to +2 volts. The rate of change of the output with respect to the input has reduced from a ratio of 3:1 to 1:1. With the gain determined by the ratio of $R_{fb}$ to $R_{in}$, since $R_{in}$ has remained constant, $R_{fb}$ must have changed upon conduction of the feedback transistor 92 to effect the above ratio change. The change being the result of paralleling potentiometer 94 plus resistor 96 with potentiometer 74 plus resistor 76.

The output will now change on a 1 to 1 basis with the input so long as the input signal is greater than −8 volts and another feedback transistor does not turn on. Assume the input signal continues to increase, eventually passing through zero to +2 volts. The output voltage will decrease, will pass through zero, and when the input is +2 volts the output will be −6 volts. If the bias supply connected to the feedback resistor 102 is also −6 volts the feedback transistor 98 will pass into its conducting state and the rate of change of the output with respect to the input will again assume a new ratio. As the input signal increases from +2 volts to +6 volts the output will be decreasing from −6 volts to −8 volts. The change in output with respect to a change in input will now equal one-half. Again the only term that changed in the $R_{fb}$ to $R_{in}$ ratio is the feedback resistance. This being the result of paralleling the feedback resistor 102 plus potentiometer 100 with the previously paralleled groups.

Any number of segments can be used to shape the output signal simply by paralleling additional feedback transistors with transistor 72. In FIG. 3, the number of segments in the output signal is three and the number of feedback transistors is also three. For an output signal with *n*-segments it is merely necessary to have *n*-number of feedback transistors. Transistor $Q_n$ in FIG. 2, representing the *n*th transistor, is connected in the feedback circuit in a manner identical to the three previously described feedback transistors. Thus, the base electrode *b* connects to the emitter electrode *e* of transistor 68. The emitter electrode *e* of transistor $Q_n$ is connected through a feedback potentiometer $P_n$ and a feedback resistor $R_n$ to a bias supply set for the desired conduction point of transistor $Q_n$. The collector electrode *c* connects to the common junction of all the collector electrodes of the feedback transistors and the bias resistor 78.

Figure 4:
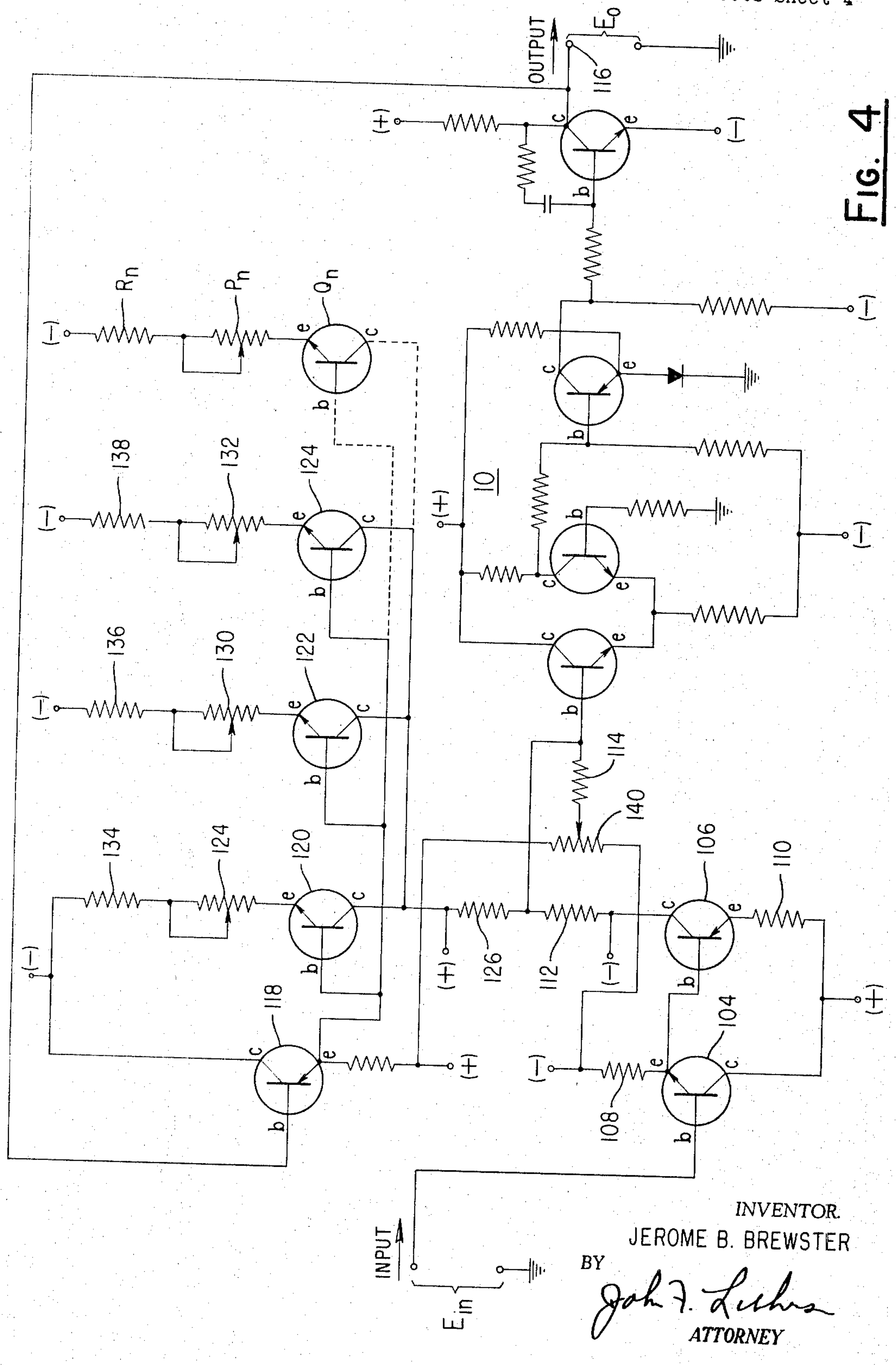
FIG. 4 is a schematic diagram of a transistorized function generator having an output voltage $E_o$ with an inverse slope from the output voltage of the circuit of FIG. 2.

Referring now to FIG. 4, I show a circuit similar to that of FIG. 2, with the exception that the input and feedback transistors have reversed junctions from their counterparts in FIG. 2. Also the bias supplies are set so that the feedback transistors are conducting at the minimum input signal resulting in the lowest gain. As will be pointed out later, this results in an input signal which is the mirror image of the output signal from the circuit of FIG. 2.

As in the circuit of FIG. 2, the circuit of FIG. 4 includes a pair of complementary input transistors 104 and 106. Where before they were PNP and NPN junctions, in that order, they are now NPN and PNP junctions. Of course, the polarity of the various bias supplies connected to the emitter *e* and the collector *c* of transistor 104 and the emitter *e* of transistor 106 will be reversed.

A change in input signal $\Delta E_{in}$ connected to the base electrode *b* of transistor 104, produces a change in current through an emitter resistor 108 connected to the emitter *e* of transistor 104. The change in current being proportional to the change in input signal. The voltage signal developed at the emitter *e* of transistor 104, as a result of current flow through resistor 108, is nearly equal to the input signal and is connected to the base electrode *b* of transistor 106. Again the purpose of employing complementary input transistors is to cancel the $V_{be}$ drop of transistor 106. The signal connected to the base electrode *b* of transistor 106 in turn produces a current through an input resistor 110 and thru a bias resistor 112 connected to the emitter *e* and collector *c* of transistor 106 respectively.

An incremental change in current through the collector-emitter junction of transistor 106 causes a voltage signal to be developed across a base drive resistor 114. The voltage so developed is the input signal to the amplifier 10 which is identical to the amplifier of FIG. 2. After amplification, the voltage developed across resistor 114 will appear as the output signal of the function generator at terminal 116 and as the base drive voltage to a transistor 118 in the feedback loop. In general, the feedback loop of the circuit of FIG. 4 is identical to that of FIG. 2, with the exception that the transistors have oppositely doped junctions and they are biased conducting at the highest value of input signal. Thus, the base electrode *b* of the feedback transistors 120, 122, 124 to $Q_n$ are connected to the emitter electrode *e* of transistor 118. The collector electrodes of feedback transistors 120, 122, 124 to $Q_n$ are connected to a common point and to a bias resistor 126 which in turn is connected to the junction of the bias resistor 112 and the base drive resistor 114. Connected to the emitter electrodes *e* of the feedback transistors 120, 122, 124 to $Q_n$ are feedback potentiometers 128, 130, 132 to $P_n$ respectively. Connected to each of the feedback potentiometers 128, 130, 132 to $P_n$ is a feedback resistor 134, 136, 138 to $R_n$.

Referring to FIG. 5, I show a typical three segment output signal for the circuit of FIG. 4 where the feedback loop contains three feedback transistors 120, 122, and 124 and the input and output signals vary from −10 volts to +10 volts. When the input signal is −10 volts the output will be biased by means of a potentiometer 140 to equal +10 volts. An incremental change of 4 volts at the input signal, for example, from −10 volts to −6 volts results in a 2 volt change in the output signal from +10 volts to +8 volts. Substituting the 2 volt input change and the 4 volt output change in Equation 4 gives a ratio of $R_{fb}$ to $R_{in}$ of 1 to 2 and a gain of one-half. In FIG. 3 the curve had a slope of one-half when the feedback loop included three feedback transistors and all were conducting. In FIG. 5 the curve has a slope of one-half (or the function generator has a gain of one-half) when feedback transistors 120, 122 and 124 are conducting. The feedback potentiometer plus the feedback resistor in each of the emitter circuits of feedback transistors 120, 122 and 124 are paralleled resulting in a total feedback resistance $R_{fb}$ equal to one-half the input resistance $R_{in}$. As the input signal increases from −6 volts to −2 volts the output signal decreases from +8 volts to +6 volts. If transistor 124 has a +6 volt bias supply connected to its emitter electrode it will now be cut off. For another incremental change of 4 volts in the input signal, from −2 volts to +2 volts, the output signal will now change 4 volts from +6 volts to +2 volts. The ratio of $R_{fb}$ to $R_{in}$ is equal to 1 and the function generator has a gain of unity. When the function generator has a gain of one an input signal increase from +2 volts to +8 volts causes the output signal to decrease from +2 volts to −4 volts. Transistor 122 will cut-off at a −4 volt output if its emitter bias supply is −4 volts. After transistor 122 cuts off only transistor 120 remains to determine the value of feedback resistor $F_{fb}$. Now as the input signal changes 1 volt, from +9 volts to +10 volts, the output signal changes 3 volts, from −7 volts to −10 volts. The incremental gain is 3 and the feedback resistor $R_{fb}$ is 3 times the value of the input resistor $R_{in}$.

Comparing the curve of FIG. 3 with that of FIG. 5, it will be noted one is the mirror image of the other. The output of the circuit of FIG. 2, as shown in FIG. 3, has a maximum gain at the lowest input signal whereas the output of the circuit of FIG. 4, as shown in FIG. 5, has a minimum gain. When the input signal is at a maximum, the gain of the circuit of FIG. 2 is at a minimum and the gain of the circuit of FIG. 4 at a maximum, as shown in FIGS. 3 and 5 respectively.

Figure 6:
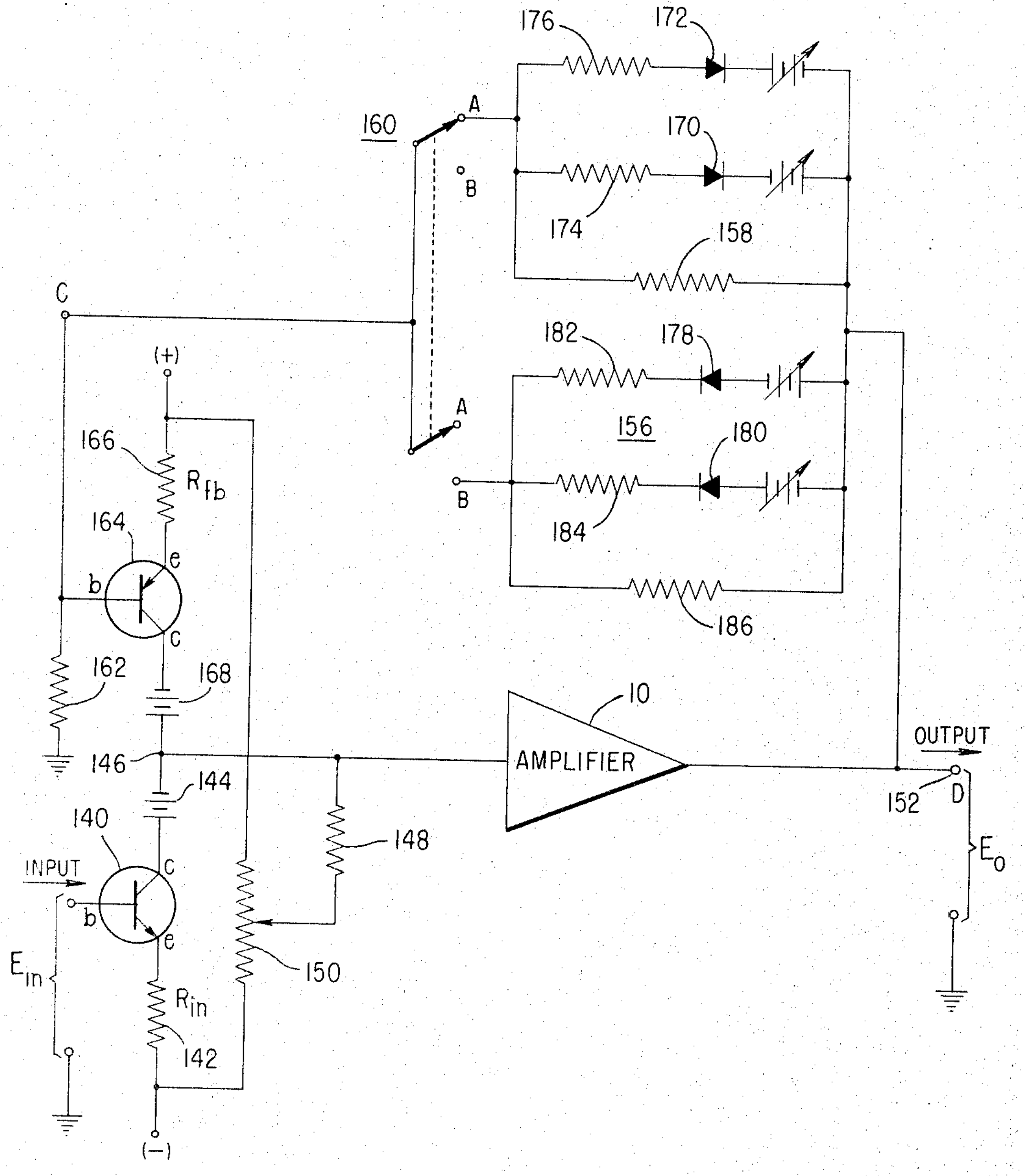
FIG. 6 is a schematic of an alternate embodiment of my invention wherein diodes are employed in the feedback loop to segment the output signal.

Referring to FIG. 6, I show an alternate embodiment of the feedback circuit where the segmented output curve is generated by a diode feedback circuit. In this circuit, the system between points C and point D represent an operational amplifier with the gain being adjustable by the feedback and input resistors, as before, and by diode elements in the feedback path.

Again I employ a summation input circuit including an input transistor 140 having a base, emitter and collector electrode. An input signal connected to the base electrode *b* generates an input current $i_{in}$ through an input resistor 142 connected to the emitter electrode *e* and to a direct current supply. The input current also flows through a bias supply 144, here shown as a battery, connected to the collector electrode *c* and to a current summing junction 146.

An incremental change in the input current, $i_{in}$, is algebraically added with the feedback current $i_{fb}$ at the summing junction 146. The instantaneous difference between the input and feedback currents develops a base drive voltage across a base resistor 148 connected to the summing junction 146 and a potentiometer 150. The base drive voltage across resistor 148 is the input signal to an amplifier 10, which can be of the type discussed in FIGS. 2 and 4.

Connected to the output terminal 152 of the amplifier 10 are two parallel diode feedback circuits 154 and 156. Diode circuit 154 includes a feedback resistor 158 connected to the output terminal 152 and contact A of a two position switch 160. With the two position switch 160 in the position shown, the feedback resistor 158 forms part of a voltage divider network with resistor 162. The voltage developed across resistor 162 is the base voltage connected to the base electrode *b* of a feedback transistor 164. Since the output signal connects to the feedback transistor 164 through a voltage divider, the minimum gain obtainable from adjustment of the feedback elements is unity. Using my current summation circuit in addition to the diode feedback circuit, gains of less than 1 are possible. The voltage connected to the base electrode *b* of transistor 164 develops a feedback current $i_{fb}$ in a feedback resistor 166 connected to the emitter electrode *e* and a direct current supply. The feedback current $i_{fb}$ is connected to the current summing junction 146 through a bias supply 168, shown here as a battery, which in turn connects to the collector electrode *c* of the feedback transistor 164. At the summing junction 146 the instantaneous values of the feedback current and the input current are added as discussed previously.

In the circuits of FIGS. 1, 2 and 4, the gain is adjustable by varying the ratio of the feedback resistor $R_{fb}$ to the input resistor $R_{in}$. For gains of less than 1, the feedback resistor $R_{fb}$ is smaller than the input resistor $R_{in}$. For gains greater than 1 the input resistor $R_{in}$ must be smaller than the feedback resistor $R_{fb}$. In FIG. 6 the gain is likewise adjustable by varying the input or feedback resistors. In addition, it is adjustable by varying the ratio of the voltage divider resistances.

To generate a segmented output signal with the circuit of FIG. 6, I change the ratio of resistances in the voltage divider. By increasing or decreasing that part of the output voltage $E_o$ connected to the base electrode *b* of the feedback transistor 164 the gain of the function generator can be decreased or increased. Paralleling additional resistors with resistor 158 decreases the gain as will be shown shortly.

Paralleled with resistor 158 is a plurality of diodes 170 and 172 biased to conduct at various levels of output voltage. Although I show only two such diodes more can be used if more than three segments are desired to represent the output signal, it is only necessary to parallel additional diodes in the feedback circuit.

For purposes of this description I will again assume a signal range of −10 volts to +10 volts. As the output decreases from +10 volts, due to an increasing input signal, it will eventually forward bias diode 170. This causes resistor 174 to be paralleled with resistor 158 thereby changing the voltage divider ratio and increasing the voltage drop across resistor 162. By increasing the voltage across resistor 162 the gain of the function generator will be lowered. If the output voltage continues to decrease diode 172 will also be forward biased and resistors 176, 174 and 158 will be paralleled. The voltage divider ratio again changes with a still larger voltage drop developed across resistor 162.

With switch 160 in the A position the output signal can be made to follow the curve of FIG. 3. Changing the switch 160 to position B will cause the output signal $E_o$ to vary along a curve similar to that shown in FIG. 5. In position B the diode circuit 156 will be connected in the feedback loop. At the highest value of output signal, +10 volts, the gain will be low assuming diodes 178 and 180 are biased conducting. All three feedback resistors 182, 184 and 186 are paralleled and the drop across resistor 162 nearly equals the output voltage. Now, as the output voltage decreases the feedback diodes become back-biased, first diode 178 will be back-biased thereby reducing the parallel combination to feedback resistors 184 and 186. At a still lower value of output signal, diode 180 will be back-biased leaving only resistor 186 in the voltage divider circuit with resistor 162.

Figure 7:
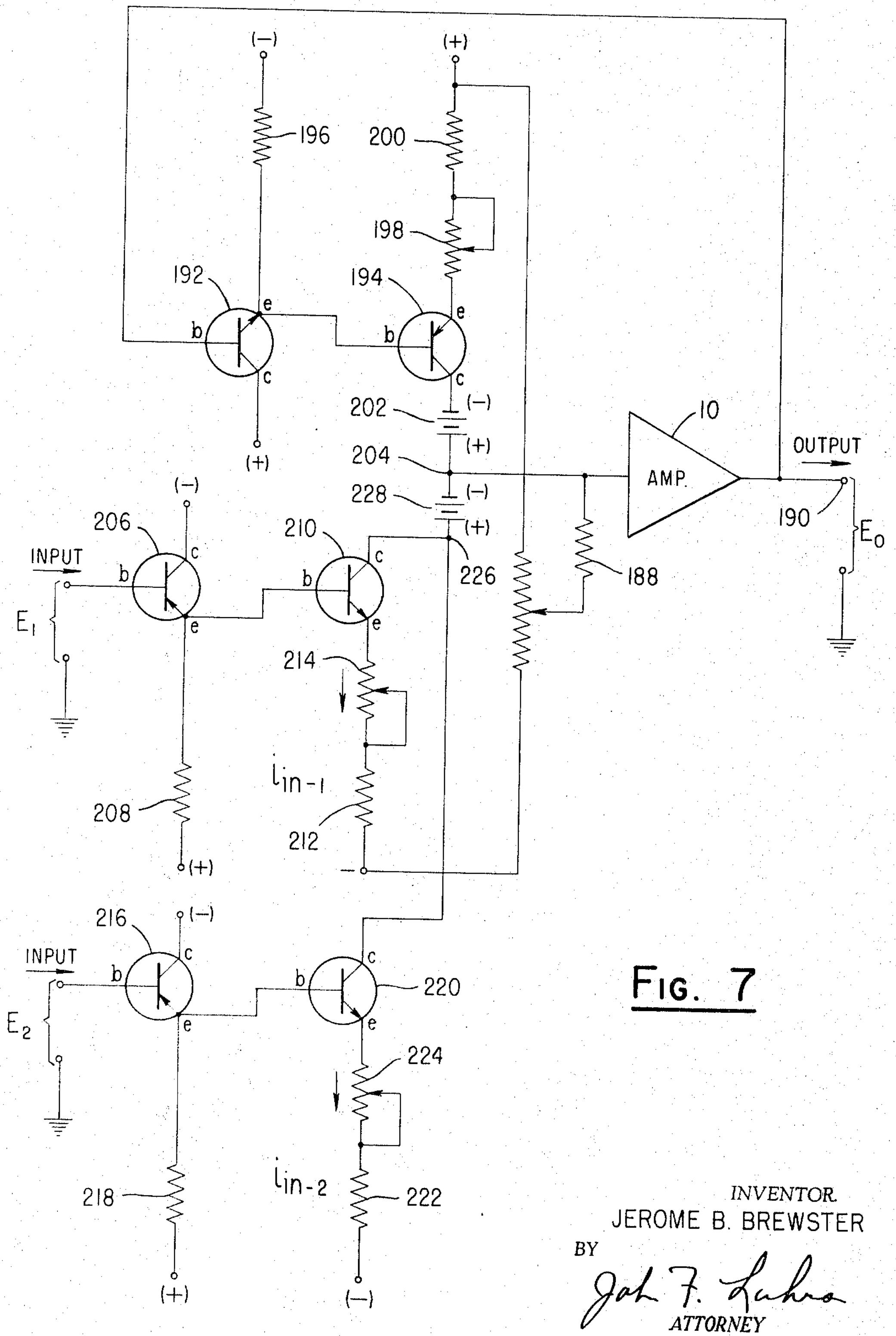
FIG. 7 is a schematic diagram of a circuit for generating an output signal proportional to a plurality of input signals.

Referring now to FIG. 7, I show a function generator with an output signal varying proportionally to two input signals. I show an amplifier 10, which can be of the type described in FIG. 2, having an input signal equal to the voltage drop developed across a base drive resistor 188.

The output signal of the amplifier 10 and the function generator appears at an output terminal 190.

Connected to the output terminal 190 is a feedback circuit including transistors 192 and 194. Transistor 192 compensates for the $V_{be}$ drop of transistor 194 as explained earlier with regards to transistor 68 of FIG. 2. The output signal connected to the base electrode *b* of transistor 192 develops a current in an emitter resistor 196 connected to the emitter electrode *e*. A D.C. bias supply biases transistor 192 conducting for all values of output signal through the emitter resistor 196. The voltage developed at the emitter electrode *e* of transistor 192 connects to the base electrode *b* of transistor 194 and causes a current flow in a feedback potentiometer 198 and a feedback resistor 200 connected to the emitter electrode *e* of transistor 194. The base voltage also develops a current flow in the collector electrode *c* and through a bias supply 202, shown as a battery connected to the current summing junction 204.

Algebraically added to the feedback current $i_{fb}$, that is, the current of collector *c* of transistor 194, at the summing junction 204 is the input currents $i_{in-1}$ and $i_{in-2}$. Input signal $E_1$, connected to the base electrode *b* of transistor 206, controls the current flow through the collector-emitter junction of transistor 206 and in turn through an emitter resistor 208 connected to emitter *e*. Transistor 206 is biased by a D-C supply connected to the collector electrode *c* and by a second D-C supply connected to the emitter resistor 208. The voltage signal developed at the emitter electrode *e* of transistor 206 is connected to the base electrode *b* of an input transistor 210 thereby generating the input current $i_{in-1}$ proportional to the change in input signal $\Delta E_{in}$ and determined in part by the resistance of an input resistor 212 and an input potentiometer 214 connected to the emitter electrode *e*.

Input signal $E_2$ connected to the base electrode *b* of transistor 216, generates a current in the collector-emitter junction of transistor 216 and in an emitter resistor 218 connected to the emitter *e*. A voltage nearly equal to the input signal $E_2$ is developed at the emitter electrode *e* of transistor 216 and the base electrode *b* of an input transistor 220. The voltage connected to the base of transistor 220 determines the input current $i_{in-2}$ through the input resistor 222 and feedback potentiometer 224 connected in series to the emitter electrode *e*. The instantaneous value of input current $i_{in-2}$ will vary with a change in input signal $\Delta E_{in}$ and be determined in part by the resistance of input resistor 222 and input potentiometer 224.

Input currents $i_{in-1}$ and $i_{in-2}$ are algebraically added at a summing junction 226 and the total input current connected to the summing junction 204 through a bias supply 228, shown here as a battery. At the summing junction 204 the total of input currents $i_{in-1}$ and $i_{in-2}$ is algebraically added to the feedback current $i_{fb}$. As explained hereinbefore, the instantaneous difference between the input and the feedback develops a voltage drop across the base drive resistor 188, said voltage drop being the input signal to the amplifier 10. In the circuit of FIG. 7, the algebraic sum of $i_{in-1}$ and $i_{in-2}$ would equal the input current $i_{in}$ of Equation 4 which is modified as follows:

$$i_{fb}=-(i_{in-1}+i_{in-2}) \qquad (4')$$

If transistors 192, 206 and 216 are connected as emitter-followers then:

$$i_{fb}=-\Delta E_o/R_{fb}$$
$$i_{in-1}=\Delta E_1/R_{in-1}$$
$$i_{in-2}=\Delta E_2/R_{in-2}$$

Substituting for the current terms in Equation 4' it now becomes:

$$\Delta E_o/R_{fb}=-\Delta E_1/R_{in-1}-\Delta E_2/R_{in-2}$$

which reduces to:

$$\Delta E_o=-\Delta E_1(R_{fb}/R_{in-1})-\Delta E_2(R_{fb}/R_{in-2}) \qquad (6)$$

From Equation 6 it can be shown that the output signal $E_o$ changes proportional to a change in $E_1$ and $E_2$. The amount of change of $E_o$ with respect to a change in $E_1$ being proportional to the ratio of $R_{fb}$ to $R_{in-1}$ and the amount of change of $E_o$ with respect to a change in $E_2$ being proportional to the ratio of $R_{fb}$ to $R_{in-2}$. It will be noted that $R_{fb}$ controls the gain from both inputs while $R_{in-1}$ controls only the gain with regards to $E_1$ and $R_{in-2}$ controls the gain with regards to $E_2$. Therefore, to change the gain with respect to all inputs, the feedback resistance $R_{fb}$, which is equal to the sum of resistor 198 and potentiometer 200, would be adjusted. To change the gain with regards to $E_1$, the input resistance $R_{in-1}$, which consists of resistor 210 and potentiometer 214, would be varied. To change the gain with regards to $E_2$ the input resistance $R_{in-2}$, consisting of resistor 222 plus potentiometer 224, would be adjusted.

While particular embodiments of the present invention have been shown and described, it is apparent that changes and modifications may be made without departing from this invention in its broader aspects, and therefore the aim in the appended claims is to cover all such changes and modifications as fall within the true spirit and scope of my invention.

What I claim as new and desire to secure by Letters Patent of the United States is:

1. A solid state function generator comprising a D.C. amplifier having an input terminal and an output terminal, an input transistor having a base, an emitter, and a collector, means coupling an input signal to said base electrode, a negative feedback circuit including a primary feedback transistor having a base, an emitter and a collector, means coupling the output terminal of said amplifier to the base electrode of said feedback transistor, a summing junction connected to the collector electrodes of said input and feedback transistors and to the input terminal of said amplifier, means connecting the emitter of said primary feedback transistor to a D.C. potential and means connecting the emitter of said input transistor to a second D.C. potential.

2. A solid state function generator as set forth in claim 1 wherein said means connecting the emitter of said feedback transistor to a D.C. potential includes a feedback resistor and wherein said means connecting the emitter of said input transistor to a second source of D.C. potential includes an input resistor.

3. A solid state function generator as set forth in claim 1 wherein said negative feedback circuit includes a plurality of secondary feedback transistors each having a base, an emitter and a collector, the base electrodes of said secondary feedback transistors connected to the emitter electrode of the primary feedback transistor, and means associated with each of said secondary transistors causing each secondary transistor to conduct at a predetermined value of base potential.

4. A solid state function generator as set forth in claim 1 wherein said negative feedback circuit includes a primary feedback resistor and a plurality of secondary feedback circuits connected in parallel with said primary feedback resistor, each of said secondary feedback circuits including a resistor connected in series with a diode and means biasing each diode to conduct at a predetermined value of the output signal from said amplifier.

5. A solid state function generator as set forth in claim 1 wherein said summing junction includes a potentiometer having a wiper arm and two end terminals; one of said terminals connected to said second D.C. potential, the other terminal connected to the first D.C. potential, and a resistor having one terminal connected to the wiper arm of said potentiometer and the other terminal connected to said summing junction.

6. A solid state function generator as set forth in claim 1 wherein said means coupling the input signal to the base electrode of the input transistor includes a compensating transistor connected in emitter-follower configuration and wherein said means coupling the output terminal of said amplifier to the base electrode of said feedback transistor also includes a compensating transistor connected in emitter-follower configuration.

7. A solid state function generator as set forth in claim 4 wherein said negative feedback circuit includes a second primary feedback resistor and a second plurality of secondary feedback circuits connected in parallel with said second primary resistor, each of said secondary feedback circuits including a resistor connected in series with a diode and means biasing each diode to render it nonconducting at a predetermined value of the output signal from said amplifier and means selectively rendering one or the other of said primary feedback resistors and the plurality of secondary feedback circuits connected in parallel therewith operative in said negative feedback circuit.

8. A solid state function generator comprising an amplifier having an input terminal and an output terminal, a first input transistor having a base, an emitter and a collector, means coupling a first input signal to said base, a second input transistor having a base, an emitter and a collector, means coupling a second input signal to the base of said second input transistor, a negative feedback circuit including a primary feedback transistor having a base, an emitter and a collector, means coupling the output terminal of said amplifier to the base electrode of said feedback transistor, a summing junction connected to the collector electrode of each of said input transistors, the collector electrode of said feedback transistor and to the input terminal of said amplifier, means connecting the emitter electrode of said feedback transistor to a source of D.C. potential and means connecting the emitter electrode of each of said input transistors to a source of D.C. potential which is negative with respect to said first named potential.

9. A function generator comprising an amplifier having an input terminal and an output terminal, a feedback circuit connected to said input terminal and to a source of D.C. potential, means coupled to said output terminal varying the impedance of said feedback circuit in functional relationship to the output signal of said amplifier, a first input circuit connected to said input terminal and to a second source of D.C. potential, means varying the impedance of said first input circuit in functional relationship to a first input signal, a second input circuit connected to said input terminal and to said second source of D.C. potential and means varying the impedance of said second input circuit in functional relationship to a second input signal.

References Cited

UNITED STATES PATENTS

| | | | |
|---|---|---|---|
| 3,106,684 | 10/1963 | Luik | 328—142 |
| 3,196,362 | 7/1965 | Smith | 330—14 |
| 3,212,019 | 10/1965 | Schwartz | 330—14 |

ROY LAKE, *Primary Examiner.*

E. FOLSOM, *Assistant Examiner.*